Jan. 1, 1952
A. E. ALLEN
2,581,062
HANDLE STRUCTURE
Filed Aug. 30, 1948
2 SHEETS—SHEET 1
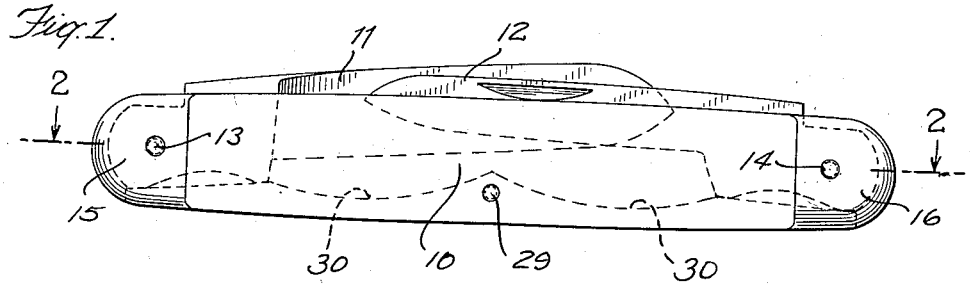
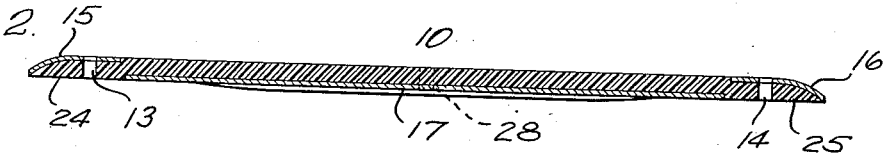
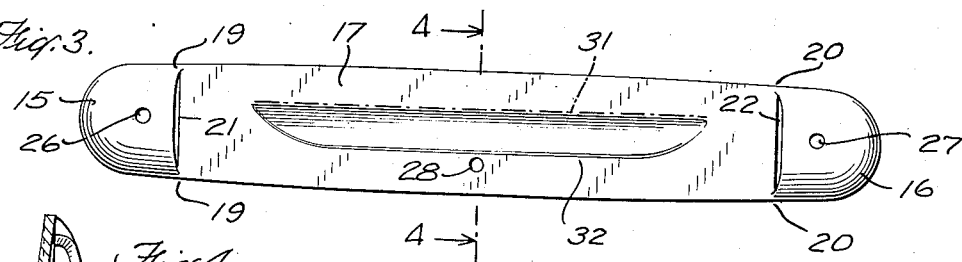
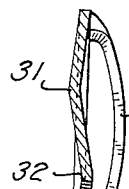
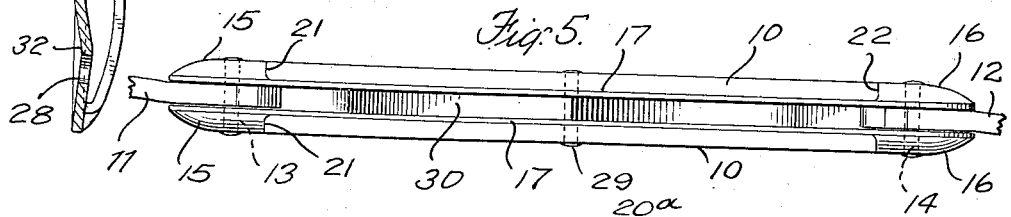
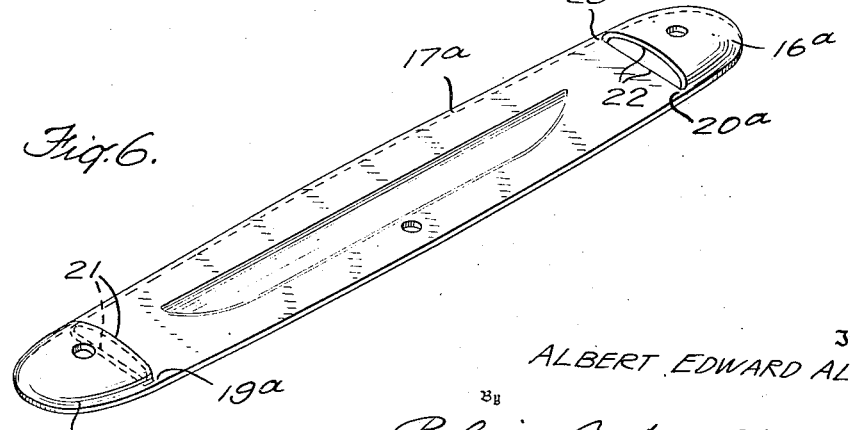
Inventor
ALBERT EDWARD ALLEN.
By
Blair Curtis + Hayward
Attorneys Jan. 1, 1952     A. E. ALLEN     2,581,062
HANDLE STRUCTURE
Filed Aug. 30, 1948     2 SHEETS—SHEET 2
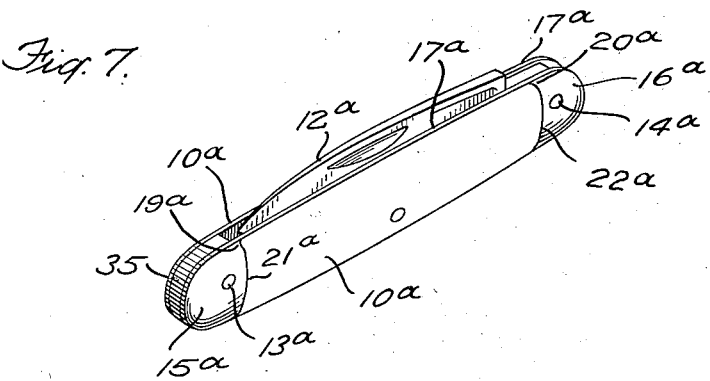
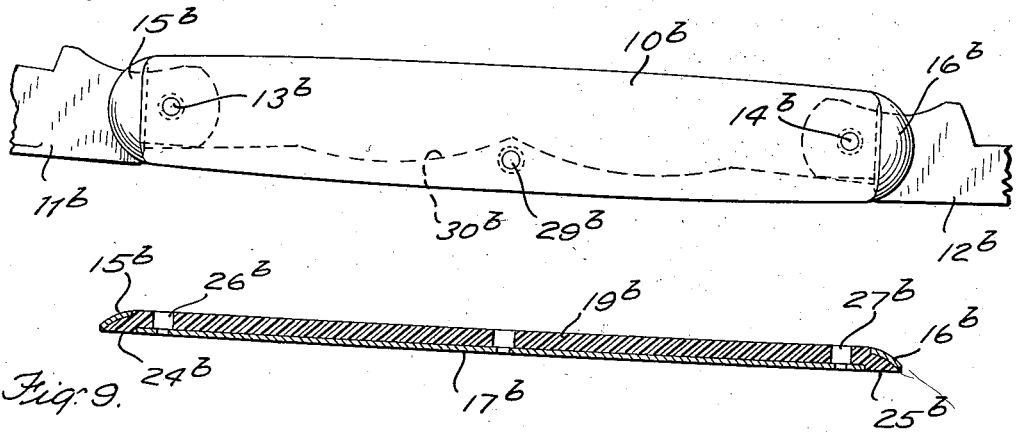
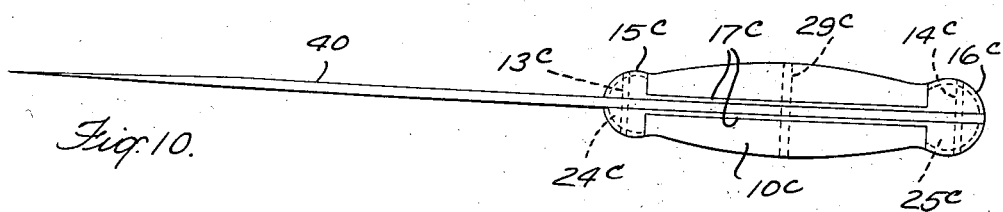
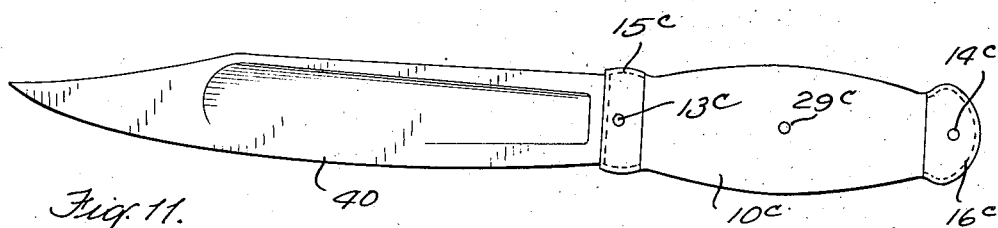
Inventor
ALBERT EDWARD ALLEN
By
Blair, Curtis & Hayward
Attorneys Patented Jan. 1, 1952

2,581,062

UNITED STATES PATENT OFFICE 2,581,062

HANDLE STRUCTURE

Albert Edward Allen, Utica, N. Y., assignor to Utica Cutlery Company, Utica, N. Y.

Application August 30, 1948, Serial No. 46,895

8 Claims. (Cl. 30—164)

This invention relates to handles for cutlery and like implements. It has for a primary object the provision of strong, durable, and sightly articles which can be utilized with comfort, ease and satisfaction and can be readily and inexpensively manufactured. More specifically an object of the invention is to provide in or for an article of cutlery a handle unit of such character that the strength and permanence of the handle and of the entire article is enhanced. A further object is the provision of a pocket knife construction having an improved appearance, strength, and permanence. Another object is the provision of an arrangement for holding knife parts in place with particular effectiveness. Other objects are to reduce the manufacturing cost and at the same time to improve the quality of handles for knives and like implements.

Other objects of the invention will in part be obvious and will in part appear hereinafter.

Articles of cutlery such as pocket knives, hunting knives, kitchen knives, fish knives and the like are commonly provided with handles having bone, horn, plastic or mother of pearl, etc., in the central part but with tips of metal to protect such handle grip material from chipping and other damage. In the case of folding knives, etc., a longer metal part, known as the bolster, is provided to give anchorage for the rivets or pivot pins on which the blades are mounted. Both the handle grips or ornamental covers and the tips or bolsters are secured to a flat metal plate (often called the "scale") or directly to a blade which gives the handle most of its strength. It has also been known, however, to make the plate and tips or bolsters in one piece, e. g., by die casting tip or bolster portions onto the plates or by stamping the ends of the plates to a form which stands up above the central part thereof and serves in place of the ordinary tip or bolster. In some cases these stamped end portions have been partially severed from the central part of the plate so that projections on the handle grips can be hooked into the hollow tip or bolster; such slitting of the plate, however, weakens it at the very point where its strength is required to withstand the stresses imposed on the rivet which secures the blade and to transmit them to the handle. Moreover, the hollow bolster construction requires a thicker plate or the use of a stronger metal if it is to give a strength and holding power for the rivet through the blade.

An important object of the present invention is to cure these defects of the hollow tip or hollow bolster construction and to permit use of lighter metal plates with results more nearly equal to the best solid bolster construction.

In accordance with the invention a plate portion is formed by stamping as in the case of the hollow bolster construction and a slit is formed centrally of the plate at the border between the tip or bolster and the central area to be occupied by the handle facing. The handle material is then applied and molded in situ to give the desired handle form and to extend integrally through the slits and to fill the hollow tip or bolster, thus giving a solid, strong and unitary handle structure. Holes and/or projections desired for assembly in the knife or other implement can also be provided in the molding or stamping operations with important economies of manufacture.

The use of molded plastic in a knife handle has of course long been known and it has been suggested to put hollow metal caps into the mold for such handles to form bolsters on their ends; but such handles had then to be secured to metal plates in the same way as handles of horn or pearl or ivory or wood etc. My invention on the contrary makes the plate and the bolsters and the handle grip all one piece and each reinforcing the other; and thus effects important economies in cost of materials and manufacture.

For a fuller understanding of the nature and objects of the invention, reference should be had to the following detailed description taken in connection with the accompanying drawings, in which:

Figure 1 is a side view of one form of pocket knife embodying the invention;

Figure 2 is a sectional view of the rear side thereof along the lines 2—2 in Figure 1;

Figure 3 is a front side view of one plate of the knife of Figures 1 and 2;

Figure 4 is an enlarged lateral sectional view along the line 4—4 of Figure 3;

Figure 5 is a top view of the knife of Figures 1–3 showing the blades in open position and partly broken away;

Figure 6 is a perspective view of the front of the plate of a single-bladed jackknife;

Figure 7 is a perspective view of such a single-bladed knife;

Figure 8 is a side view of another pocket knife embodying the invention, the blades being shown in open position;

Figure 9 is a view in central longitudinal section of one plate and handle portions of Figure 8;

Figure 10 is a plan view of the back of a hunting knife embodying the invention; and Figure 11 is a side view thereof.

The form of construction exemplified by Figures 1–8 provides a knife having handle portions 10 which are preferably formed of a hard tough molded plastic material, which may be a resilient cellulose acetate composition of a polyvinylchloride or vinylacetate, vinylchloride co-polymer, a vinylidene chloride polymer, a polyamide plastic, e.g., nylon or other available plastic. The blades 11 and 12 of the knife are pivoted, respectively, on rivets 13 and 14 which extend, respectively, through a pair of bolsters 15 and a pair of bolsters 16. The respective bolsters are integral with the plates 17 in only a part of their width (narrow border areas 19 and 20 in the example shown) and are severed therefrom over a part of the width 21 or 22 so that the plastic of the handle extends integrally into and fills the hollow bolsters 16 as shown at 24 and 25. Two such plates 17 and the spring 18 enclose a space for blades 11 and 12, as in a conventional knife. Pursuant to the present invention the ends 24 and 25 of the handle portions are in contact with substantially the entire inner surfaces of the hollow bolsters 15 and 16 and substantially fill the hollow bolster giving compressive strength and rigidity to the bolsters. It is to be noted that the shanks of the blades 11 and 12 when open, overlap the plates 17 beyond the boundaries of the bolsters so that the plastic is reinforced against the stresses exerted by the blade.

The bolster portions are formed with holes 26 and 27 thru which the rivets 13 and 14 extend. These holes may be punched or drilled thru the metal plates 17 in the usual way, and pins in the plastic mold may serve to mold the holes in the plastic; or the plastic can be molded solid and the holes subsequently drilled. Each plate 17 is also provided with a rivet hole 28 to receive a rivet 29 by which the spring 30 is secured in place. As shown in Figures 1–5, the middle portion of each of the plates 17 is bent slightly inward along an upper longitudinal axis as shown at 31 and slightly outward along a lower longitudinal axis as shown at 32 so as to provide extra longitudinal stiffness and to give a funnel form better fitting the blades.

In a preferred procedure for the formation of the knife, the bolster-and-plate member 17 is stamped from sheet brass, or other sheet metal as desired, to the form shown in Figs. 2 and 3, the holes 26, 27, and 28 being made at the same time by a stamping die, and the longitudinal corrugations 31 and 32 being formed at the same time. The bolster or tip portions are drawn to shallow cups as shown and are sheared in the central area along lines 21 and 22. The plastic material is molded over the plate 17 and thru the slits 21 and 22 into the hollow bolsters to form a construction such as shown in Fig. 2. Ordinarily the holes are filled with plastic in this operation and are rebored after the plastic has hardened. The plastic for the handle may be moulded in accordance with standard practice.

Two side assemblies so formed are then assembled with a knife spring 30 and blades 11 and 12, and the rivets 13, 14 and 29 secured in place in the usual manner. In Figs. 6 and 7 a single blade pocket knife is shown having handles 10a, and bolsters 15a and 16a connected respectively by portions 19a and 20a to one of a pair of plates 17a. The single blade 12a is pivoted on a rivet 14a; the rivet 13a serving merely to assist in holding together the structure which in the present instance includes a spacer 35.

The end members may likewise be varied widely in shape and purpose. For example, there is shown in Figs. 8 and 9 a form of construction wherein the end members 15b and 16b of the plates 17b are in the form of tips rather than bolsters and are not pierced by the rivets 13b and 14b the holes 26b and 27b for which are formed in the plates 17b in the present instance. These rivets 13b and 14b serve as pivots for the blades 11b and 12b which are controlled by a spring 30b pivoted at 29b. The handle portions 19b each have integral portions 24b and 25b molded into and filling the hollow tips.

The invention is likewise effective when embodied in fixed blade structures. One such article is exemplified in Figs. 10 and 11 as a hunting knife wherein blade 40 is provided with molded plastic handles 10c. Plates 17c extend between the handles and the blade, and these are stamped or drawn at their ends to provide bolster portions 15c and 16c thru which rivets 13c and 14c extend. As in the case of Figures 1–9, the plates 17c are partially severed to provide open inner ends on the bolsters 15c and 16c. A molded plastic forms the handle 10c and extends integrally thru said open ends into the bolsters 15c which are filled thereby and made solid. A central rivet 29c may be used to assist in holding the handle together.

The plastic may be molded by any of the usual methods, e. g. powder molding, tablet molding, injection molding or casting. The invention in its broad aspects includes the molding of materials other than organic plastics, e. g., die casting of metals, powder metal pressing and cementing or compression adhesion of powders which are not strictly plastics.

While there are given above several specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt it and apply it in numerous forms, each as may be best suited to the requirement of a particular use.

What is claimed is:

1. A handle structure comprising a plate at least one end of which is partially severed from an adjacent portion thereof and is dished above said adjacent portion to provide a hollow raised end open from its hollow to the front of said adjacent portion, and a grip member accurately fitting against and supporting the inner surface of said hollow end, overlying the front of said adjacent portion and extending integrally thru and fitting the opening into said hollow end.

2. A handle structure comprising a plate at least one end of which is partially severed from an adjacent portion thereof and is dished above said adjacent portion to provide a hollow raised end open from its hollow to the front of said adjacent portion, and a grip member fitting said hollow end portion to the level of the back of said adjacent portion, overlying the front of said adjacent portion and extending integrally thru and fitting the opening into said hollow end.

3. A handle structure for a knife as defined in claim 2 in which the hollow end and its filling serve as a bolster extending a substantial distance on each side of a rivet location whereby said handle is riveted to an implement.

4. A handle structure for a knife as defined in claim 2 in which the grip member where it overlies said adjacent portion of the plate is substantially flush with the exterior of the hollow end portion thereof.

5. A handle structure as defined in claim 2 wherein edge portions of substantial width extend integrally and unsevered around the handle in substantially the same plane.

6. An article of cutlery comprising a plate, one end of which that has a greater extent transversely of the plate than longitudinally thereof being transversely centrally separated from the body of the plate and offset laterally beyond the line of separation to provide an integral tip, and a handle overlying said body and extending into and substantially filling said tip.

7. An article of cutlery comprising a plate the end portions of which are transversely separated centrally from an adjacent portion of the plate and offset above the adjacent portion at the line of separation, to provide hollow ends which are open toward said adjacent portion, and a handle grip overlying said body and extending into said hollows and being in engagement with at least the major part of the inner surface of said hollow ends.

8. A folding knife comprising a pair of plates one end portion of each of which is transversely separated centrally from a central part of the plate and offset laterally beyond the line of separation to provide a hollow bolster integral at its edges with said central part of the plate, a rivet extending thru said bolster, a blade secured by said rivet, and a tough plastic overlying said body and extending into said bolster and into accurately fitting and supporting relation to said bolster in the area surrounding said rivet.

ALBERT EDWARD ALLEN.

REFERENCES CITED

The following references are of record in the file of this patent:

UNITED STATES PATENTS

| Number | Name | Date |
| --- | --- | --- |
| 1,843,584 | Tillmanns et al. | Feb. 2, 1932 |
| 2,195,846 | Balder | Apr. 2, 1940 |
| 2,303,302 | Paolantonio | Nov. 24, 1942 |